United States Patent
Arnold et al.

(10) Patent No.: US 9,574,585 B2
(45) Date of Patent: Feb. 21, 2017

(54) METHOD AND CONTROL UNIT FOR THE OPERATION OF A PARKING BRAKE OF A VEHICLE TRANSMISSION ASSEMBLY

(71) Applicant: ZF Friedrichshafen AG, Friedrichshafen (DE)

(72) Inventors: Jörg Arnold, Immenstaad (DE); Thilo Schmidt, Meckenbeuren (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 204 days.

(21) Appl. No.: 14/457,326

(22) Filed: Aug. 12, 2014

(65) Prior Publication Data
US 2015/0040549 A1 Feb. 12, 2015

(30) Foreign Application Priority Data

Aug. 12, 2013 (DE) .................... 10 2013 215 906.4

(51) Int. Cl.
*G01M 13/02* (2006.01)
*F15B 19/00* (2006.01)
*F15B 13/04* (2006.01)
*F15B 20/00* (2006.01)
*F16H 63/34* (2006.01)
*F16H 61/12* (2010.01)

(52) U.S. Cl.
CPC ......... *F15B 19/005* (2013.01); *F15B 13/0401* (2013.01); *F15B 20/008* (2013.01); *F16H 63/3483* (2013.01); *F15B 2013/0409* (2013.01); *F15B 2211/30565* (2013.01); *F15B 2211/8636* (2013.01); *F15B 2211/87* (2013.01); *F15B 2211/8757* (2013.01); *F16H 2061/1208* (2013.01)

(58) Field of Classification Search
USPC ............... 73/115.01, 115.02, 115.03
See application file for complete search history.

(56) References Cited

U.S. PATENT DOCUMENTS

| | | | | |
|---|---|---|---|---|
| 4,653,453 A | * | 3/1987 | Kamai | F02D 11/106 123/478 |
| 5,220,828 A | * | 6/1993 | Sodeno | F02D 11/10 123/442 |
| 5,818,178 A | | 10/1998 | Marumoto et al. | |
| 5,839,984 A | * | 11/1998 | Mann | F16H 47/04 192/215 |
| 6,943,540 B2 | | 9/2005 | Vincent et al. | |
| 8,649,152 B2 | | 2/2014 | Schoeneck et al. | |
| 2010/0109426 A1 | * | 5/2010 | Fugiel | B60T 7/16 303/3 |

OTHER PUBLICATIONS

German Patent Office Search Report, Jul. 22, 2014, 10 2013 218 762.9.

* cited by examiner

*Primary Examiner* — Eric S McCall
(74) *Attorney, Agent, or Firm* — Dority & Manning, P.A.

(57) ABSTRACT

A method is provided for the operation of an assembly of a vehicle, whereas the assembly is transferable from an unactuated position into an actuated position by a pressure medium-actuated actuator if two redundant pressure medium valves both occupy a pressure supply position. For the functional test of one of the valves, a first valve is controlled to occupy the pressure supply position, and the second valve is controlled so as not to occupy the pressure supply position. If, upon this control of the two valves at the pressure medium-actuated actuator or at the assembly to be operated by the pressure medium-actuated actuator, no reaction is detected, there is a correct operation at a proper second valve. If, despite this control of the two valves, at the pressure medium-actuated actuator or at the assembly to be operated by the pressure medium-actuated actuator, a reaction is detected, there is an improper operation at a defective second pressure medium valve.

5 Claims, No Drawings

METHOD AND CONTROL UNIT FOR THE OPERATION OF A PARKING BRAKE OF A VEHICLE TRANSMISSION ASSEMBLY

The invention relates to a method for operating an assembly of a vehicle. The invention also relates to a control unit to carry out the method.

BACKGROUND

In a vehicle, in particular in an automatic transmission of a vehicle, a multitude of assemblies is installed, which assemblies are operated with the assistance of a pressure medium-actuated actuator, in particular with the assistance of a hydraulically actuated cylinder, in order to transfer the same between an unactuated position and an actuated position. Thereby, under the state of the art, two redundant pressure medium valves are provided for controlling the pressure medium-actuated actuator, whereas the pressure medium-actuated actuator can be transferred from an unactuated position to an actuated position only if, in each case, the pressure medium valves occupy a pressure supply position. Thereby, the operational reliability in the operation of such an assembly of a vehicle can be increased.

If there is an undetected error at one of the redundant pressure medium valves, for example by the fact that the pressure medium valve is stuck in the pressure supply position, despite the redundant design of the pressure medium valves, a critical state may arise due to a simple error at the other pressure medium valve in combination with the undetected error that is already present; i.e., because of the fact that the assembly unintentionally occupies an actuated position. As such, there is a need to subject the redundant pressure medium valves to a functional test, in order to examine whether there is an undetected error at the pressure medium valves.

SUMMARY

Based on the above, the present invention is subject to the task of creating a new method for operating an assembly of a vehicle and a control unit for carrying out the method. Additional objects and advantages of the invention will be set forth in part in the following description, or may be obvious from the description, or may be learned through practice of the invention.

This task is solved by a method for the operation of an assembly of the vehicle in accordance with the invention described herein, wherein the assembly is transferrable from an unactuated position into an actuated position by a pressure medium actuator if two redundant pressure medium valves both occupy a pressure supply position.

In accordance with the invention, for the functional test of one of the redundant pressure medium valves, a first pressure medium valve is controlled in such a manner that the same occupies the pressure supply position, whereas the second pressure medium valve is controlled in such a manner that the same does not occupy the pressure supply position. If, upon this control of the two pressure medium valves at the pressure medium-actuated actuator or at the assembly to be operated by the pressure medium-actuated actuator, no reaction is detected, there is a correct operation at a proper operating second pressure medium valve. If, despite this control of the two pressure medium valves at the pressure medium-actuated actuator or at the assembly to be operated by the pressure medium-actuated actuator, a reaction is detected, there is an improper operation at a defective second pressure medium valve.

With the method in accordance with the invention, previously undetected errors at the redundant pressure medium valves can be reliably detected. Thus, malfunctions that can be brought about by an undetected error at a pressure medium valve can be easily and reliably avoided.

According to an advantageous additional embodiment, the redundant pressure medium valves are alternatingly subject to a functional test, preferably such that the redundant pressure medium valves are subject to a functional test alternating from ignition cycle to ignition cycle. If the functional test of the pressure medium valves is carried out alternating from ignition cycle to ignition cycle, the functional test proceeds in a manner that is not perceptible to a driver. After the actuation of the ignition, there is sufficient time to subject one of the redundant pressure medium valves to a functional test that is not perceptible to a driver.

According to an advantageous additional embodiment, if an error is detected at one of the pressure medium valves, an error message is generated and/or the actuation of the assembly is blocked. Depending on the relevance to safety of the assembly to be operated, either only one error message is generated or, in addition, the actuation of the assembly is blocked, in order to avoid conditions in the vehicle that are critical to safety.

A control device in accordance with the functional objectives of the invention is also provided.

Preferred additional embodiments are set forth in the following description.

DESCRIPTION

Reference will now be made to embodiments of the invention. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The present invention relates to a method for the operation of an assembly of a vehicle, in particular an assembly of a transmission, such as a parking brake of an automatic transmission.

The assembly to be actuated and/or operated is transferable from an unactuated position into an actuated position by a pressure medium-actuated actuator. The pressure medium-actuated actuator of a parking brake of an automatic transmission comprises in particular a hydraulically actuated cylinder.

The assembly to be operated may be transferred by the pressure medium-actuated actuator from an unactuated position into an actuated position only if two redundant pressure medium valves, which are used for activating the actuator, both occupy a pressure supply position. If only one of the two pressure medium valves occupies the pressure supply position, the pressure medium-actuated actuator is not able to transfer the assembly from the unactuated position into the actuated position. This by itself can ensure, to a certain extent, a high degree of operational reliability in the operation of the particular assembly of the vehicle.

In the case of a parking brake of an automatic transmission to be operated, the parking brake may be disengaged with the use of a hydraulic cylinder only if each of the two hydraulic valves being used to activate the hydraulic cylinder occupies a pressure supply position.

In order to detect the existence of a so-called "undetected error" at the pressure medium valves, it is proposed in accordance with the invention to, for the functional test of one of the redundant pressure medium valves, control a first pressure medium valve in such a manner that the same occupies the pressure supply position, whereas the second pressure medium valve is controlled in such a manner that the same does not occupy the pressure supply position. At that point, whether a reaction is detected upon this control of the two pressure medium valves at the pressure medium-actuated actuator or at the assembly to be operated by the pressure medium-actuated actuator is monitored.

If no reaction at the pressure medium-actuated actuator and/or at the assembly to be operated by the same is determined, there is a correct operation at the properly operating second pressure medium valve, at which no undetected error is then present. On the other hand, if at that point, despite this control of the two pressure medium valves at the pressure medium-actuated actuator or at the assembly to be operated by the pressure medium-actuated actuator, a reaction is detected, there is an improper operation at a defective second pressure medium valve and/or at the presence of an undetected error on the same.

If the assembly of the vehicle to be operated is a parking brake of the automatic transmission, whether or not the parking brake is disengaged upon the above control of the redundant pressure medium valves is accordingly monitored. If the parking brake is disengaged although the second pressure medium valve was controlled in such a manner that the same did not occupy the pressure supply position, there is an improper operation from a previously undetected error at the second pressure medium valve.

The above functional test of the redundant pressure medium valves takes place in an alternating manner, preferably alternating from ignition cycle to ignition cycle. Thereby, the functional test can be carried out in a manner not perceptible to a driver.

If, upon the above functional test, a previously undetected error is detected on a pressure medium valve, at least one error message is generated and stored in a control unit. It can also be provided that further actuation of the assembly is to be blocked, and thereby the availability and/or drivability of the vehicle is to be limited. The measures to be taken upon the detection of a previously undetected error depend on the relevance to safety of the assembly of the vehicle to be operated.

The invention also relates to a preferably electronic control unit, in particular a transmission control unit, with means for carrying out the method. Such means comprise data interfaces, a processor and a memory.

Through the data interfaces, data are served with the assemblies involved in carrying out the method. The processor is used for data processing and the storage of the data.

Modifications and variations can be made to the embodiments illustrated or described herein without departing from the scope and spirit of the invention as set forth in the appended claims.

The invention claimed is:

1. A method of operation for an assembly in a vehicle, the assembly transferable from an unactuated position to an actuated position by an actuator that is supplied with a pressurized medium through two redundant pressure medium valves if both of the valves are in a pressure supply position, the method comprising:
   performing a functional test of one of the pressure medium valves by:
     controlling a first one of the pressure medium valves to be in the pressure supply position, and controlling the second one of the pressure medium valves to be in a non-supply position;
     actuating the actuator and monitoring the actuator or assembly for an operational reaction;
     whereas if no reaction is detected, the second pressure medium valve is properly functioning; and
     whereas if a reaction is detected, the second pressure medium valve is defective.

2. The method as in claim 1, wherein the assembly is a parking brake of an automatic transmission in the vehicle, and functional operation of the parking brake is determined by functional testing of the first and second pressure medium valves that actuate the parking brake.

3. The method as in claim 1, further comprising alternately testing the first and second pressure medium valves according to the method of claim 1.

4. The method as in claim 3, wherein the first and second pressure medium valves are alternately tested with alternating ignition cycles of the vehicle.

5. The method as in claim 3, further comprising generating an error message if either of the first or second pressure medium valves is determined to be defective and blocking operation of the assembly in the vehicle.

* * * * *